United States Patent [19]

Wartluft

[11] Patent Number: 5,524,940

[45] Date of Patent: *Jun. 11, 1996

[54] PIPE COUPLER DEVICE

[75] Inventor: Donald W. Wartluft, Broken Arrow, Okla.

[*] Notice: The term of this patent shall not extend beyond the expiration date of Pat. No. 5,366,260.

[73] Assignee: Continental Industries, Inc., Tulsa, Okla.

[21] Appl. No.: 408,489

[22] Filed: Mar. 22, 1995

[51] Int. Cl.$^6$ .................................................. F16L 21/04
[52] U.S. Cl. ........................ 285/322; 285/383; 285/371; 285/341
[58] Field of Search ................................. 285/339, 371, 285/383, 341, 323, 322

[56] References Cited

U.S. PATENT DOCUMENTS

| | | | |
|---|---|---|---|
| 1,814,481 | 7/1931 | Metcalf, Jr. et al. | 285/383 X |
| 2,090,380 | 8/1937 | Terry | 285/323 |
| 2,346,051 | 4/1944 | Seamark . | |
| 3,135,537 | 2/1964 | Scott | 285/383 X |
| 3,393,926 | 7/1968 | Arnold . | |
| 3,598,429 | 6/1971 | Arnold . | |
| 3,692,336 | 9/1972 | Zon . | |
| 3,713,675 | 1/1973 | White, Jr. . | |
| 3,999,782 | 12/1976 | Shotbolt et al. . | |
| 4,068,866 | 1/1978 | Saha . | |
| 4,107,452 | 8/1978 | Razvi . | |
| 4,138,144 | 2/1979 | Pierce, Jr. . | |
| 4,213,641 | 7/1980 | Bennett . | |
| 4,229,025 | 10/1980 | Volgstadt et al. . | |
| 4,422,673 | 12/1983 | Blackford et al. . | |
| 4,438,954 | 3/1984 | Hattori . | |
| 4,445,714 | 5/1984 | Kisiel, III . | |
| 4,712,813 | 12/1987 | Passerell et al. . | |
| 4,807,912 | 2/1989 | Maier | 285/383 X |
| 5,207,459 | 5/1993 | Glover . | |
| 5,366,260 | 11/1994 | Wartluft . | |

FOREIGN PATENT DOCUMENTS 2209373  5/1989  United Kingdom ................. 285/22

*Primary Examiner*—Terry Lee Melius
*Assistant Examiner*—Heather Chun Shackelford
*Attorney, Agent, or Firm*—Head, Johnson & Kachigian

[57] ABSTRACT

A coupler for securing at least one pipe having a planar end. A hollow rigid coupler shell and a rigid tube stiffener are secured in the shell by a hub member, the stiffener having an external diameter less than an internal diameter of the pipe. The hub member has an internal diameter less than an external diameter of the pipe, the hub member having at least one tubular extension which will engage the pipe planar end. The coupler shell has a narrowing internal portion with a separate straight internal portion. At least one hollow follower is provided in the coupler shell straight portion adjacent the hub member tubular extension and at least one flexible hollow boot is movably retained within the coupler shell internal straight and narrowing portions, with a plurality of serrations being provided on an interior surface of the boot. At least one gripper is provided in the coupler shell to prevent the pipe from exiting the coupler shell, whereby the pipe can be positioned within the coupler shell to encompass a portion of the stiffener, the planar end of the pipe abutting the hub and between the hub member tubular extension and the stiffener.

15 Claims, 4 Drawing Sheets

PIPE COUPLER DEVICE

BACKGROUND OF THE INVENTION

1. Field of the Invention

The present invention is directed to a stab-type coupler for securing at least one pipe having a planar end. In particular, the present invention is directed to a stab-type coupler device that is installed by sliding the pipe into the coupler device.

2. Prior Art

In liquid and gas distribution, conveying and transportation systems, it is often required to couple the end of one pipe segment to the end of another pipe segment or to provide an end fitting for a pipe segment or to provide other type fittings.

Stab-type couplers are known devices used to secure together pipes, often plastic or nonmetallic types of pipes. These types of couplers may be used to quickly and easily fasten together pipes that are being installed in the field. It is desirable to employ a coupler with a minimum number of separate parts. The seal between the pipe or pipes and the coupler must be fluid-tight so that it is sealed against leakage of gas or liquids and must also provide a secure fitting so that the pipe or pipes will not become detached after coupled.

After installation, axial stresses continue for various reasons including temperature induced variations in the length of the pipes.

It is desirable to provide an integral coupler device that will adhere and seal to a pipe simply by sliding an end of the pipe into the coupler.

It is also desirable to provide a stab-type coupler device for pipes wherein the greater the axial removal force, the more the pipe is secured with the coupling.

It is also desirable to provide a stab-type coupler for joining pipes that requires no adhesively glued or fused joints.

It is also desirable to provide a stab-type coupler wherein no grease or lubricant is required to assure a fluid-tight seal.

It is also desirable to provide a stab-type coupler having a sealing boot and follower which functions independently of the movement of the tube and the coupler shell.

SUMMARY OF THE INVENTION

The present invention provides a pipe coupler device for securing pipes having planar ends. A straight hollow stiffener extends through the length of the coupler device. The stiffener has an external diameter slightly less than an internal diameter of the pipes to permit the pipes to be slipped over the ends of the stiffener.

The stiffener is secured within the coupler device by a hub member midway between the stiffener ends. The hub member surrounds the external circumference of the stiffener.

The hub member is secured radially within the coupler device by a hollow and elongated, rigid coupler shell. The shell has openings at each end which communicate via separate internal narrowing portions with a straight internal portion.

A protective outer body surrounds the shell and holds it in position around the hub member.

The hub member has a pair of vertical walls which are vertical to the axis of the stiffener. The hub member has an internal diameter less than the external diameter of the pipe to be received by the coupling device. The hub member has a pair of opposed tubular extensions which will engage the planar ends of the pipes. The tubular extensions have a common axis with the stiffener and with the pipe so that the tubular extensions form cylindrical extensions from the hub member.

Adjacent to the hub member tubular extensions and enclosed within the internal straight portion of the shell are hollow followers. The hollow followers are wedged against and abut the tubular extensions.

Adjacent each hollow follower is a hollow boot being removably retained within the coupler shell. Each boot is retained within the straight and narrowing portions of the shell. Each boot includes a plurality of serrations on an inner surface of the boot. The serrations are backwardly oriented so that they are forced into a tighter sealing engagement with the pipe when an outward pressure force is exerted on the pipe.

The boots each have front faces which movingly engage grippers. The grippers within the coupler shell prevent the boots from exiting the coupler shell through the shell openings. The grippers likewise have a series of serrations. External surfaces on the grippers are generally frusto-conical in shape so that the external surfaces coincide in shape and slope to the narrowing portions of the shell.

Once the pipes have been fully inserted into the coupler device, the pipes are held in place by the backward-oriented gripper serrations on the hollow grippers. If an outward pulling force is exerted on the pipes, the grippers are caused to be pulled slightly outwardly which wedges the grippers between the narrowing portions of the shell and the pipes, causing the gripper serrations to more tightly bite into the pipes.

DETAILED DESCRIPTION OF THE PREFERRED EMBODIMENTS

Figure 1:
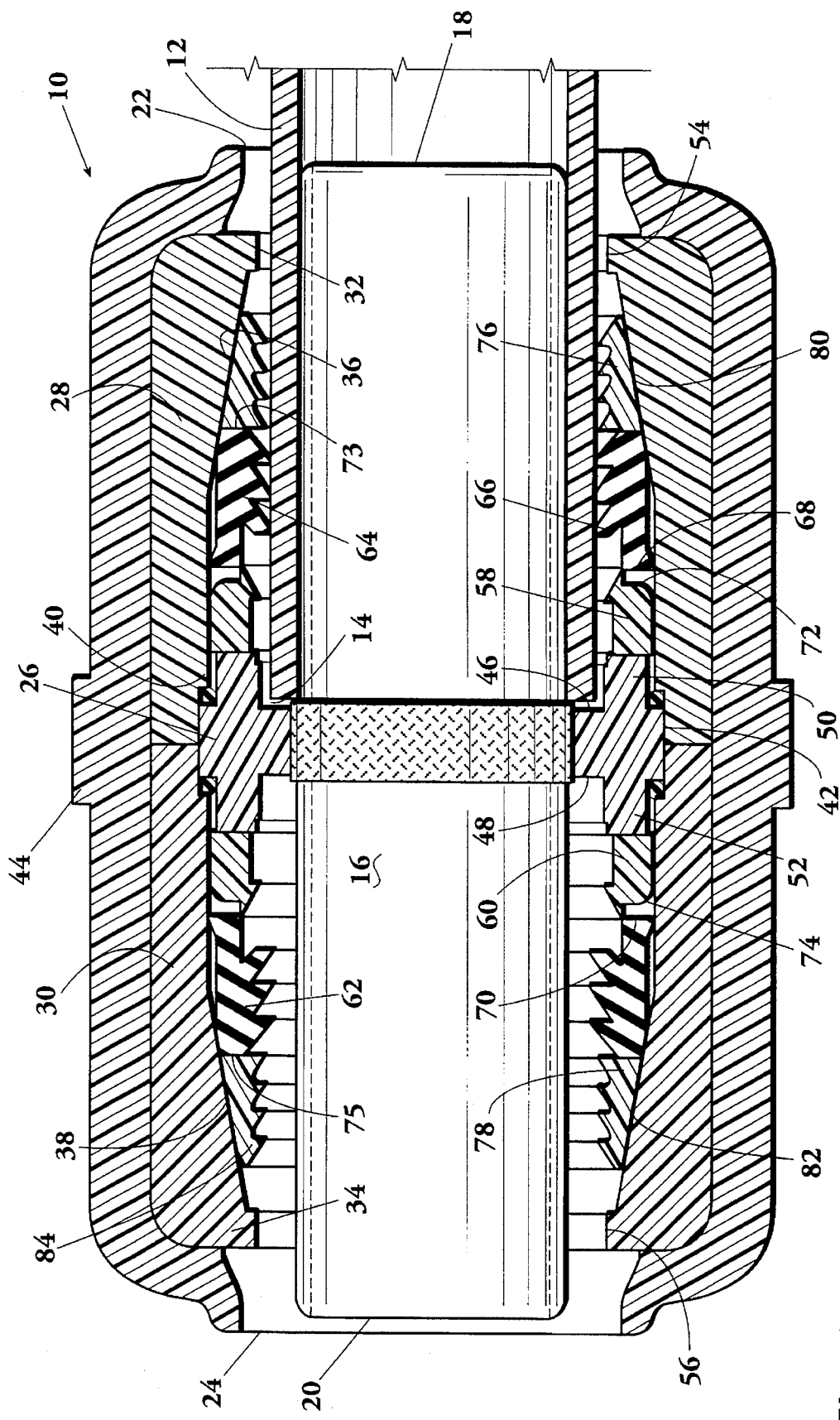
FIG. 1 is a sectional view of a pipe coupler device for securing tube pipes constructed in accordance with the present invention.

Referring to the drawings in detail, FIG. 1 illustrates a sectional view of a pipe coupler device 10 for securing two pipes having planar ends. In FIG. 1, one pipe 12 having a planar end 14 is shown inserted in the coupling 10.

The device 10 is provided with a straight hollow stiffener 16 in the form of a tube that extends through the length of the coupler device 10. The stiffener 16 is constructed of a rigid material, such as plastic or metal. The stiffener 16 has ends 18 and 20 that protrude up to open ends 22 and 24 on the coupler device.

The stiffener 16 has an external diameter slightly less than an internal diameter of the pipes, such as pipe 12, to permit the pipes to be slipped over the ends 18 and 20.

The stiffener 16 is secured within the coupler device by a hub member 26 approximately midway between the stiffener ends 18 and 20. The hub member 26 surrounds the external circumference of the stiffener.

The hub member is secured radially within the coupler device 10 by a hollow and elongated, rigid coupler shell comprised of shell halves 28 and 30. The shell has openings 32 and 34 at each end which communicate via separate internal narrowing portions 36 and 38 with a separate, straight internal portion 40. The internal narrowing portions 36 and 38 are frusto-conical in shape. The shell halves 28 and 30 also have a portion with an enlarged internal diameter 42 to receive and secure the hub member 26.

A protective outer body 44 surrounds the shell halves 28 and 30 and holds them in position around the hub member 26.

Each shell half 28 and 30 has an internal straight portion having a uniform internal diameter.

The hub member 26, the inner shell halves 28 and 30 and the outer protective body 44 are all constructed of a rigid material such as a hard plastic.

The hub member 26 has a pair of vertical walls 46 and 48 which are vertical to the axis of the stiffener 16. The hub vertical walls 46 and 48 are also vertical to the straight portion 40 of the shell. The vertical walls 46 and 48 are arranged so that the hub member has an internal diameter less than the external diameter of the pipe 12 to be received by the coupling device 10. The hub member 26 has a pair of opposed tubular extensions 50 and 52 which will engage the planar end of the pipes. The tubular extensions have a common axis with the stiffener 16 and the pipe 12 so that the tubular extensions form cylindrical extensions from the hub member. It will be appreciated that the hub member 26 and the tubular extensions act as a registration mechanism for the pipe 12.

Adjacent and outward from the internal straight portion 40 are the internal narrowing portions 36 and 38. Each of the narrowing portions 36 and 38 progressively decreases in internal diameter when moving outward from the straight portion. Adjacent each of the narrowing portions 36 and 38 are lips 54 and 56, respectively, at the shell openings 32 and 34.

Adjacent to the hub member tubular extensions 50 and 52 and enclosed within the straight portion 40 of the shell are hollow followers 58 and 60. When in place, the hollow followers 58 and 60 are wedged against and abut the tubular extensions 50 and 52, respectively.

Adjacent each hollow follower 58 and 60 is a hollow boot 62 and 64, respectively, being movably retained within the coupler shell. Each boot 62 and 64 is retained within the straight and narrowing portions of the shell. Each boot includes a plurality of sawtooth-shaped ridges or serrations 66 on an inner surface of the boot. The serrations 66 flex to allow the pipe to be inserted into the coupler 10. Once the pipe has been inserted into the coupler 10, the serrations 66 flex back against the pipe, forming multiple ring seals along the pipe 12. The serrations 66 are backwardly oriented so that they are forced into a tighter sealing engagement with the pipe 12 when outward pressure force is exerted on the boot.

A rear face 68 and 70 of each boot 62 and 64 is movingly engaged with a recess 72 and 74 in each follower.

The boots 62 and 64 each have front faces 73 and 75 which movingly engage grippers 76 and 78. The grippers 76 and 78 in the coupler shell prevent the boots 62 and 64 from exiting the coupler shell through the shell openings 32 and 34. The grippers 76 and 78 likewise have a series of sawtooth-shaped ridges or serrations 84. Once the pipe 12 has been inserted into the coupler device 10, the serrations 84 flex back against the pipe 12 forming multiple grips along the pipe. The serrations are backwardly oriented so they are forced into a tighter gripping engagement with the pipe when an outward force is exerted on the pipe. Additionally, if the pipe experiences high internal pressure, the serrations are forced into tighter sealing engagement with the pipe.

External surfaces 80 and 82 on the grippers are generally frusto-conical in shape so that the external surfaces 80 and 82 coincide in shape and slope to the narrowing portions of the shell 36 and 38. The grippers 76 and 78 are preferably constructed of rigid material, such as a plastic. A front face on each gripper movingly engages the lips 54 and 56 of the shell. The lips prevent the grippers from exiting the shell and causing the grippers to remain within the coupler 10. The grippers 76 and 78, in turn, hold the boots within the shell.

Unlike the serrations found on the boots, the gripper serrations 84 are not flexible. When the pipes are inserted into the coupler device, the grippers 84 are pushed slightly inward pushing the grippers inwardly along the narrowing portion of the shell until the rear face of each gripper abuts the front faces 73 and 75 of the boots. Engagement of the grippers with the front faces 73 and 75 prevents any further movement of the grippers within the coupler. Additional inward pushing force exerted on the pipe or pipes causes the pipe or pipes to slide past the gripper serrations 84 so that the pipes pass within the hollow grippers.

Once the pipe or pipes have been fully inserted into the coupler, the pipes are held in place by the backward-oriented gripper serrations 84 on the hollow grippers. If an outward pulling force is thereafter exerted on the pipes, the grippers 84 adhere to the pipes by means of the gripper serrations. The pulling force causes the grippers 76 and 78 to be pulled slightly outwardly causing their exterior surfaces to travel outwardly along the narrowing portions. This outward movement of the grippers wedges the grippers 76 and 78 between the narrowing portions of the shell and the pipes, causing the gripper serrations 84 to more tightly bite into the pipes, thus preventing the pipes from being withdrawn from the coupler.

It will be observed from the foregoing that the pipe 12 will be secured to the coupler by sliding the pipe end into the coupler. No glued or fused joints are required.

Figure 2:
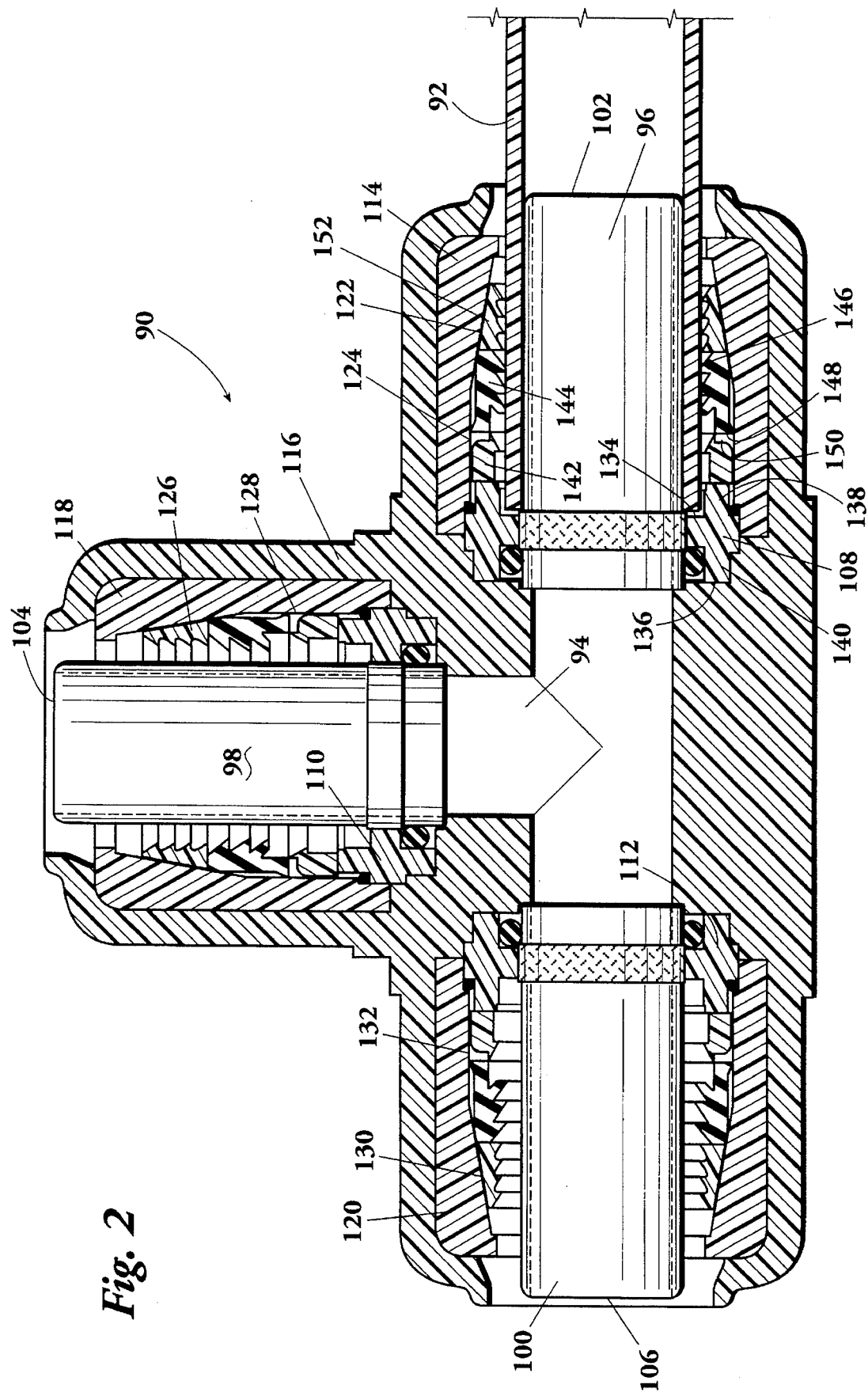
FIG. 2 is a sectional view of an alternate embodiment of a pipe coupler device in the form of a T-connection constructed in accordance with the present invention.

FIG. 2 illustrates an alternate embodiment 90 of the pipe coupler device of the present invention in the form of a T-connection. The coupler 90 will join the planar ends of three pipes together. In FIG. 2, only one pipe 92 is shown inserted in the coupling 90.

A rigid, hollow T-tube 94 has a tubular stiffener connected at each open end. The stiffeners 96, 98 and 100 each have ends 102, 104 and 106, respectively, that protrude to the open ends on the coupler 90. Each stiffener has an external diameter slightly less than the internal diameter of the pipes to permit the pipes to be slipped over the stiffener ends 102, 104 and 106.

Each stiffener is secured within the coupler device 90 by a hub member 108, 110 and 112. Each hub member 108, 110 and 112 surrounds the external circumference of the stiffener. The hub members are secured radially within the coupler device by a hollow coupler shell and by an outer body 116. Thus, hub member 108 is secured by coupler shell 114 and by outer body 116. Likewise, hub member 110 is secured by shell 118 and outer body 116. Hub member 112 is secured by shell 120 and outer body 116.

Shell 114 has a separate narrowing internal portion 122 and a separate, straight internal portion 124. Likewise, shell 118 has an internal narrowing portion 126 and a separate straight internal portion 128. Shell 120 includes a separate narrowing internal portion 130 and a separate straight internal portion 132.

Hub member 108 has a pair of vertical walls 134 and 136 vertical to the axis of the stiffener 96. The hub member 108 has a pair of opposed tubular extensions 138 and 140. Tubular extension 138 engages the planar end of the pipe 92.

An O-ring lies between the tubular extension 140 and the stiffener 96.

Adjacent to the hub member tubular extension 140 and enclosed within straight portion 124 of the shell 114 is a hollow follower 142. When in place, the hollow follower 142 is wedged against and abuts the tubular extension 140.

Adjacent the hollow follower 142 is a hollow boot 144 being movably retained within the coupler shell. The boot is retained within the straight and the narrowing portion of the shell. Each boot includes a plurality of sawtooth-shaped ridges or serrations 146 on an inner surface of the boot. The serrations 146 flex to allow the pipe to be inserted into the coupler 90. Once the pipe has been inserted into the coupler 90, the serrations 146 flex back against the pipe, forming multiple ring seals along the pipe.

A rear face 148 of the boot 144 is movingly engaged with a recess 150 in the follower. The boot 144 movingly engages a gripper 152. The gripper in the coupler shell prevents the boot from exiting the coupler shell. The gripper, likewise, has a series of serrations 154.

Figure 3:
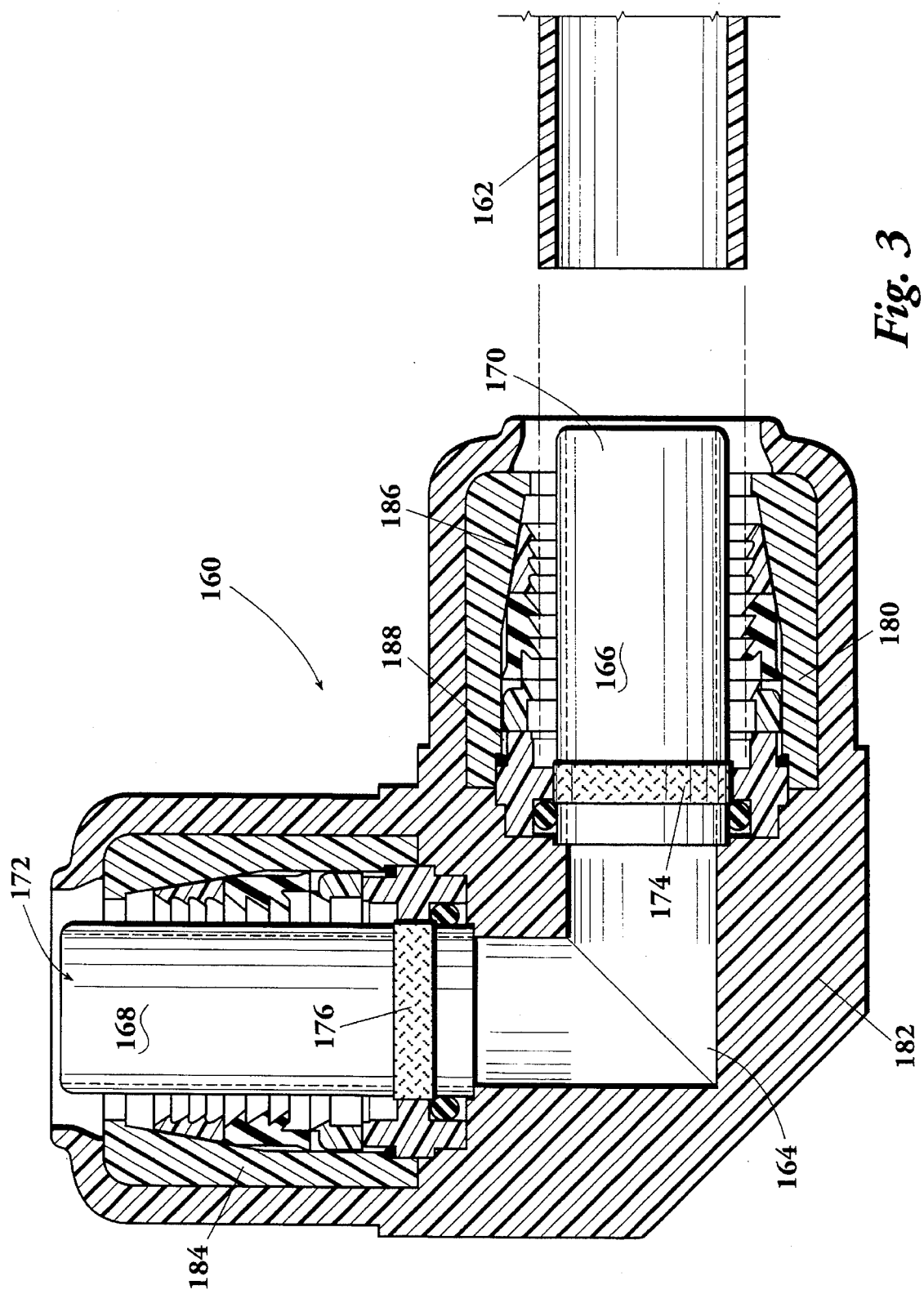
FIG. 3 is a sectional view of a further alternate embodiment of a pipe coupler device in the form of an elbow fitting constructed in accordance with the present invention.

FIG. 3 shows a further alternate embodiment 160 of the coupler device in the form of an elbow connection. The coupler 160 will join the planar ends of two pipes, one of which 162 is shown in FIG. 3 exploded from the coupler device 160.

A rigid, hollow elbow tube 164 has a tubular stiffener 166 and 168 connected at each open end. Each stiffener 166 and 168 has an external diameter slightly less than the internal diameter of the pipes to permit the pipes to be slipped over the stiffener ends 170 and 172. Each stiffener 166 and 168 is secured within the coupler device 160 by a hub member 174 and 176, respectively. Each hub member surrounds the external circumference of its stiffener. The hub member 174 is secured by coupler shell 180 and by outer body 182. Likewise, hub member 176 is secured by coupler shell 184 and outer body 182.

Coupler shell 180 has an internal narrowing portion 186 and a straight internal portion 188. The operation of the elbow embodiment 160 shown in FIG. 3 is otherwise similar to the configuration and operation of the embodiments shown in FIGS. 1 and 2.

Figure 4:
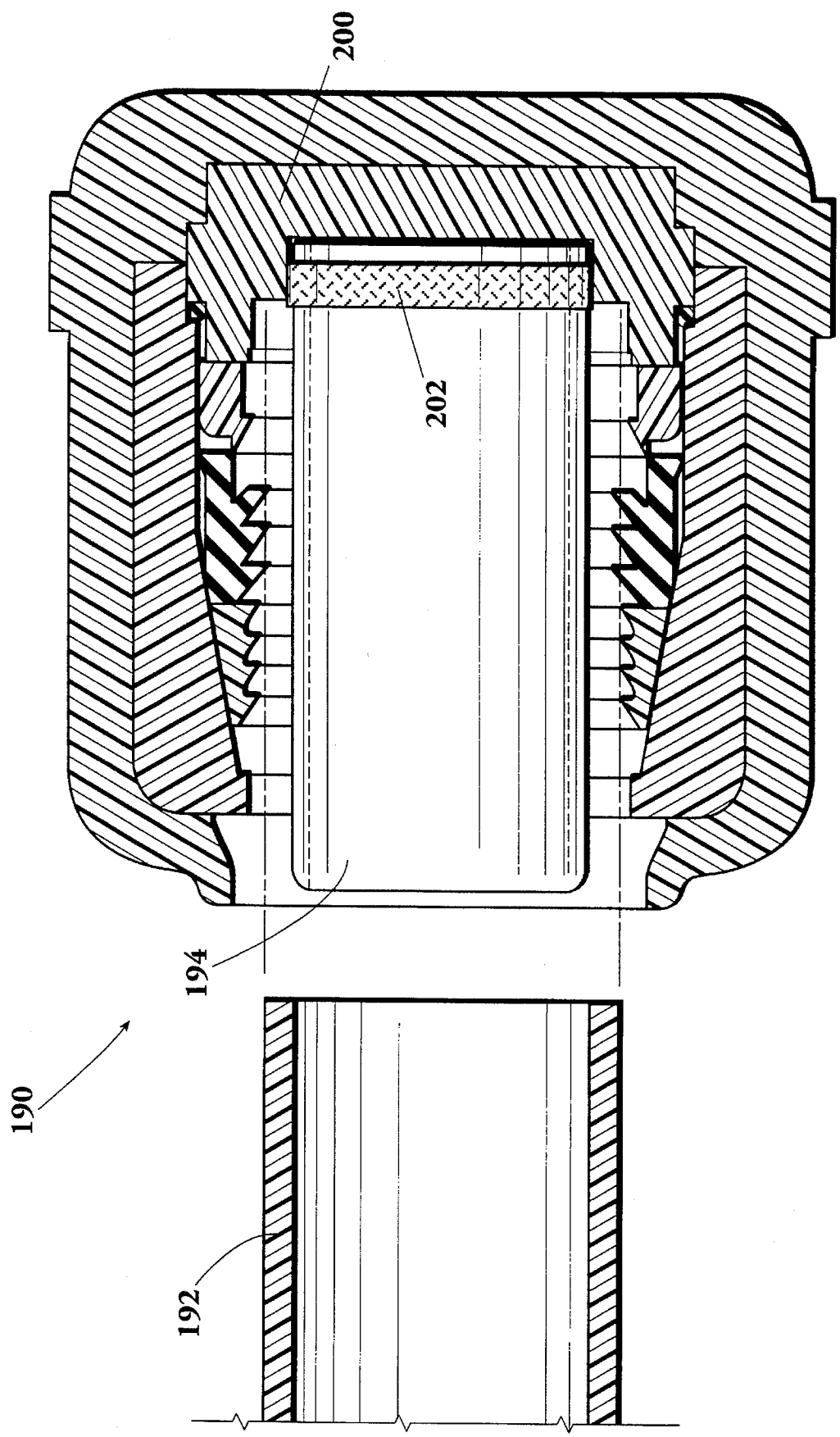
FIG. 4 is a sectional view of a further alternate embodiment of a pipe coupler device in the form of an end fitting constructed in accordance with the present invention.

FIG. 4 illustrates a further alternate embodiment 190 showing an end cap coupler. Pipe 192 is shown exploded from the end cap coupler. A stiffener 194 is secured within the coupler 190 by a hub member 200. Unlike the previously described embodiments, the hub member 200 not only surrounds the external circumference of the stiffener but forms an end for the stiffener. The hub member 200 surrounds the external circumference of the stiffener at 202.

Whereas, the present invention has been described in relation to the drawings attached hereto, it should be understood that other and further modifications, apart from those shown or suggested herein, may be made within the spirit and scope of this invention.

What is claimed is:

1. A coupler for securing at least one pipe having a radial planar end surface, said coupler comprising:

a hollow rigid coupler shell;

a rigid tube stiffener secured in said shell by a hub member, the stiffener having an external diameter less than an internal diameter of said pipe;

said hub member having an internal diameter less than an external diameter of said pipe, said hub member having at least one tubular extension which can engage said pipe planar end;

said coupler shell having a separate narrowing internal portion and a separate straight internal portion, said hub member being positioned in the straight portion;

at least one hollow follower in said coupler shell straight portion adjacent said hub member tubular extension;

at least one hollow boot being movably retained within said coupler shell internal straight and narrowing portions, a plurality of serrations being provided on an interior surface of said boot, a rear face of said boot movably engaging said follower; and at least one gripper in said coupler shell to prevent a pipe from exiting said coupler shell, whereby said pipe can be positioned within said coupler shell to encompass a portion of said stiffener, said planar end of said pipe abutting said hub and between said hub member tubular extension and said stiffener.

2. A coupler according to claim 1 wherein said coupler shell is split into two sections.

3. A coupler according to claim 1 including a protective outer body provided around said coupler shell.

4. A coupler according to claim 1 wherein said boot serrations are backwardly oriented so that said boot is forced inward as the pipe is inserted through said boot and once the pipe is inserted said serrations contact the pipe to form a seal.

5. A coupler according to claim 1 including an O-ring between each said hub member tubular extension and said coupler shell.

6. A coupler according to claim 1 for securing two pipes, said hub having two tubular extensions, said coupler having two said hollow followers, one adjacent each extension, two said hollow boots, one engaging each said follower, and two said grippers, one to prevent each said pipe from exiting said coupler.

7. A coupler according to claim 1 wherein said boot rear face engages a recess in said follower.

8. A coupler for securing at least one pipe having a radial planar end surface, said coupler comprising:

a hollow rigid coupler shell;

a rigid tube stiffener secured internally of said shell by a hub member, said stiffener having ends at least one of which extends outwardly to adjacent an opening provided in said coupler shell, the stiffener having an external diameter less than said internal diameter of a pipe to be received by the coupler;

said hub member being in the form of a short length tubular member having an internal diameter dimensioned to slidably receive said stiffener, the hub internal diameter being less than said external diameter of the pipe to be received by the coupling, said hub member having a pair of opposed tubular extensions one of which engages said pipe planar end;

said coupler shell opening communicating via a separate narrowing internal portion with a separate straight internal portion provided within said coupler shell, said hub member being positioned in the straight portion;

at least one hollow follower being provided in said coupler shell straight portion adjacent one said hub member tubular extension;

at least one hollow boot being in slidable engagement with said coupler narrowing internal portion, said boot being movably retained within said coupler shell internal straight and narrowing portions, a plurality of serrations being provided on an interior surface of said boot, a rear face of said boot movably engaging said follower; and at least one gripper being provided in said coupler shell to prevent said pipe from exiting said coupler shell internal narrowing portion through said coupler opening, whereby a pipe can be positioned within said coupler shell to encompass a portion of said stiffener, said planar end of said pipe being between said hub tubular extension and said stiffener.

9. A coupler according to claim 8 wherein said coupler shell is split into two sections.

10. A coupler according to claim 8 including a protective outer body provided around said coupler shell.

11. A coupler according to claim 8 wherein said boot serrations are backwardly oriented so that said boot is forced inward as the pipe is inserted through said boot and once the pipe is inserted said serrations contact the pipe to form a seal.

12. A coupler according to claim 8 including an O-ring between each said hub member tubular extension and said coupler shell.

13. A coupler according to claim 8 for securing two said pipes, said coupler having two said hollow followers, one adjacent each said hub member tubular extension, two said hollow boots, one engaging each said follower, and two said grippers, one to prevent each said pipe from exiting said coupler.

14. A coupler according to claim 8 wherein said boot rear face engages a recess in said follower.

15. An end coupler for securing a pipe having a radial planar end surface, said end coupler comprising:

a hollow rigid coupler shell having one open end;

a rigid tube stiffener secured in said shell by a hub member, the stiffener having an external diameter less than an internal diameter of said pipe;

said hub member having an internal diameter less than the external diameter of said pipe, said hub member having a tubular extension which will engage said pipe planar end;

said coupler shell having a separate narrowing internal portion and a separate straight internal portion;

a hollow follower in said coupler shell straight portion adjacent said hub member tubular extension;

a hollow boot being movably retained within said coupler shell internal straight and narrowing portions, a plurality of serrations being provided on an interior surface of said boot, a rear face of said boot movably engaging said follower; and a gripper in said coupler shell to prevent said pipe from exiting said coupler shell, whereby a pipe can be positioned within said coupler shell to encompass a portion of said stiffener, said planar end of said pipe abutting said hub and between said hub member tubular extension and said stiffener.

* * * * *